(12) United States Patent
Gogolla et al.

(10) Patent No.: US 10,908,284 B2
(45) Date of Patent: *Feb. 2, 2021

(54) DEVICE FOR OPTICALLY MEASURING THE DISTANCE FROM A REFLECTIVE TARGET OBJECT

(71) Applicant: Hilti Aktiengesellschaft, Schaan (LI)

(72) Inventors: Torsten Gogolla, Schaan (LI); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 403 days.

This patent is subject to a terminal disclaimer.

(21) Appl. No.: 15/575,293

(22) PCT Filed: May 11, 2016

(86) PCT No.: PCT/EP2016/060491
§ 371 (c)(1),
(2) Date: Nov. 17, 2017

(87) PCT Pub. No.: WO2016/184734
PCT Pub. Date: Nov. 24, 2016

(65) Prior Publication Data
US 2018/0156917 A1 Jun. 7, 2018

(30) Foreign Application Priority Data
May 18, 2015 (EP) .................................. 15167962

(51) Int. Cl.
*G01S 17/08* (2006.01)
*G01S 7/481* (2006.01)
*G02B 27/09* (2006.01)

(52) U.S. Cl.
CPC .............. *G01S 17/08* (2013.01); *G01S 7/4814* (2013.01); *G02B 27/0944* (2013.01); *G02B 27/0977* (2013.01)

(58) Field of Classification Search
CPC ......... G01S 17/08; G01S 7/481; G02B 15/04; G02B 27/40; G02B 19/0076; G02B 7/16; G02B 27/30; G02B 19/0047; G02B 7/006
See application file for complete search history.

(56) References Cited

U.S. PATENT DOCUMENTS

| 6,411,371 B1 | 6/2002 | Hinderling et al. |
| 6,545,749 B1 | 4/2003 | Andersson |

(Continued)

FOREIGN PATENT DOCUMENTS

| CN | 1888813 A | 1/2007 |
| DE | 197 27 988 A1 | 1/1998 |

(Continued)

OTHER PUBLICATIONS

PCT/EP2016/060491, International Search Report dated Jun. 30, 2016 (Three (3) pages).

(Continued)

*Primary Examiner* — Luke D Ratcliffe
(74) *Attorney, Agent, or Firm* — Crowell & Moring LLP (57) ABSTRACT

A device for optically measuring the distance from a reflective target object is disclosed. The device has a beam source, a detector, a beam shaping system with a transmission optical system and a reception optical system, and a laser beam shaping element that can be arranged in the path of the laser beam. The laser shaping element is designed as a shaping aperture, where the shaping aperture converts the laser beam into a shaped laser beam with one or more opening angles and the opening angles are smaller than the maximum critical angle of 0.3 mrad.

18 Claims, 6 Drawing Sheets

(56) References Cited

U.S. PATENT DOCUMENTS

| | | | |
|---|---|---|---|
| 7,800,643 B2 | 9/2010 | Hama | |
| 2016/0054446 A1* | 2/2016 | Winter | G01S 17/08 |
| | | | 356/4.01 |
| 2016/0334618 A1* | 11/2016 | Hargis | G02B 26/0875 |

FOREIGN PATENT DOCUMENTS

| | | |
|---|---|---|
| DE | 198 40 049 A1 | 4/2000 |
| DE | 102 50 583 A1 | 5/2003 |
| DE | 10 2013 205 589 A1 | 10/2014 |
| EP | 1 154 284 A1 | 11/2001 |
| EP | 2 096 459 A2 | 9/2009 |
| JP | 2001-208845 A | 8/2001 |
| JP | 2006-47079 A | 2/2006 |
| JP | 2007-298372 A | 11/2007 |

OTHER PUBLICATIONS

European Search Report issued in European counterpart application No. 15167962.8-1812 dated Oct. 22, 2015, with Statement of Relevancy (Eight (8) pages).

U.S. Patent Application, "Device for Optically Measuring the Distance from a Reflective Target Object", filed Nov. 17, 2017, Inventor: Torsten Gogolla et al.

* cited by examiner

DEVICE FOR OPTICALLY MEASURING THE DISTANCE FROM A REFLECTIVE TARGET OBJECT

This application claims the priority of International Application No. PCT/EP2016/060491, filed May 11, 2016, and European Patent Document No. 15167962.8, filed May 18, 2015, the disclosures of which are expressly incorporated by reference herein.

BACKGROUND AND SUMMARY OF THE INVENTION

The present invention relates to a device for optically measuring the distance from a reflective target object.

DE 197 27 988 A1 discloses a known device for optically measuring the distance from a reflective target object consisting of a telescope, a distance measuring device and an adjustment device for adjusting the laser beam divergence. The distance measuring device comprises a beam source which emits a laser beam, a detector which receives a reception beam reflected on the target object, and a beam shaping system comprising a transmission optical system for beam shaping of the laser beam and a reception optical system for beam shaping of the reception beam. The laser beam divergence can be changed via the exit angle of the laser beam at the beam source, via the optical path length between the beam source and the transmission optical system or by an additional transmission optical system behind the beam source. A disadvantage is that all the measures proposed to adjust the laser beam divergence take place within the distance measuring device and reduce the stability of the distance measuring device.

From DE 198 40 049 A1 is known a device for optically measuring the distance from a reflective target object. The device comprises a distance measuring device and an adjustment device for adjusting the laser beam to the target object. The distance measuring device comprises one or two beam sources, a detector and a beam shaping system with a transmission optical system and a reception optical system. The one or two beam sources generate a first laser beam having a large beam divergence and a second laser beam having a small beam divergence, wherein the first laser beam is provided for measuring the distance to the scattering target objects and the second laser beam is provided for measuring the distance to the reflective target objects.

The selection of a suitable laser beam can be made at the radiation sources or the detector. In one embodiment, the first and second laser beams are sent transmitted at the same time and hit the target. In the beam path of the reception beam optical filters are disposed before the detector that let through only the first or second laser beam. The optical filters are arranged in a manually operable or motor-driven filter wheel or filter slide that brings the individual optical filters into the beam path of the reception beam. A disadvantage is that two laser beams are required with different beam divergences to adjust the measuring the distance from the target object. To create the different beam divergences, several beam paths and beam shaping optics are required, which increase the space requirement.

DE 10 2013 205 589 A1 discloses another known device for optically measuring the distance from a reflective target consisting of a distance measuring device and an adjustment device which is located outside the distance measuring device. The distance measuring device comprises a beam source, a detector and a beam shaping system with a transmission optical system and a reception optical system. The adjustment device comprises at least one laser beam shaping element that can be arranged in the beam path of the laser beam and is designed as a scattering optics. To be able to adjust the laser beam to different distance ranges from reflective target objects, a plurality of laser beam shaping elements designed as scattering optics are provided that differ from each other in their scattering properties. In a further development, the adjustment device comprises at least one reception beam shaping element that can be arranged in the beam path of the reception beam and is formed as a scattering plate. With the aid of the scattering plate the reception beam can be attenuated to prevent overdriving of the detector. To be able to adapt the reception beam to different distance ranges from reflective targets, multiple reception beam shaping elements designed as scattering plates are provided that differ from each other in their light-scattering properties.

The known device for optically measuring the distance from a reflective target object has the disadvantage that extraneous light, for example in the form of direct or indirect sunlight, can raise the measurement error in distance measurement with a fixed measuring time and thereby degrade the accuracy of the measurement results or raise the measurement time necessary for the distance measurement. In contrast to the laser beam, extraneous light is not directed but can come in from different directions. The reception beam shaping elements designed as scattering plates attenuate extraneous light much more weakly than the directed reception beam. When surface retroreflectors are used, the known device for optically measuring distance has further disadvantages due to the beam expansion caused by the scattering optics. If the surface retroreflector is not arranged perpendicular to the optical axis of the incident laser beam, the minimum distance is not measured on the optical axis of the laser beam and the distance measured by the distance measuring device has a deviation from the actual distance. This deviation increases the more the laser beam is expanded by the scattering optics.

The object of the present invention is to develop a device for optically measuring the distance from a reflective target object that is suitable for measuring the distance from surface retroreflectors and with which extraneous light is attenuated at low equipment expense. The device should also be suitable for optically measuring distance to individual retroreflectors.

According to the invention, the device for optically measuring the distance from a reflective target object is characterized in that the laser beam shaping element is designed as a shaping aperture, where the shaping aperture converts the laser beam to a shaped laser beam with one or more opening angles and the opening angles are smaller than a maximum critical angle of 0.3 mrad. A laser beam shaping element designed as a shaping aperture that creates a shaped laser beam with opening angles smaller than 0.3 mrad is suitable for optically measuring distance to surface retroreflectors. The maximum critical angle for the opening angles of 0.3 mrad assures that a homogenization of the laser beam occurs with the measuring the distance from surface retroreflectors and the laser beam is not expanded too much.

A shaping aperture is characterized by its surface area and its dimensions. The aperture geometry of the shaping aperture determines whether the shaped laser beam has one opening angle or multiple opening angles. Shaping apertures with a circular or square aperture geometry are defined by one dimension (circle radius, side length of the square) and create laser beams having a circular beam cross-section with an opening angle constant in the circumferential direction.

Shaping apertures with an elliptical or rectangular aperture geometry are defined by two dimensions and create laser beams having an elliptical beam cross-section with an opening angle varying in the circumferential direction, with the opening angle of the elliptical laser beam in the circumferential direction varying between a maximum opening angle on the large semi-axis and a minimum opening angle on the small semi-axis of the elliptical beam cross-section. Shaping apertures with a random aperture geometry create behind the shaping aperture a laser beam with multiple opening angles that lie between a minimum opening angle and a maximum opening angle.

The opening angles of the laser beam that creates the shaping aperture can be set through the dimensions of the shaping aperture. The maximum critical angle of 0.3 mrad can be converted to a minimum dimension for the shaping aperture that may not be exceeded if the opening angles of the shaped laser beam should not exceed the maximum critical angle of 0.3 mrad. The smaller the dimensions of the shaping aperture, the larger the opening angles of the shaped laser beam in the path beam behind the shaping aperture. To achieve a good measurement performance in the distance measurement, it is advantageous in different distance ranges to use shaping apertures with different dimensions and therefore opening angles.

Particularly preferably, the shaping aperture for the laser beam is designed partially permeable. The radiant power of the emitted laser beam is designed for the measuring the distance from scattering target objects. With scattering target objects the laser beam is scattered over a large angle area, only a small part of the radiant power is registered by the reception optical system and forwarded to the detector. In the measuring the distance from reflective target objects, the laser beam is reflected at the target object and hits the detector as a directed reception beam. To prevent an overdrive of the detector, the radiant power of the reception beam incident on the detector must be much smaller than the radiant power of the laser beam emitted by the beam source. The reduction of the radiant power can occur through measures in the path of the laser beam and/or through measures in the path of the reception beam. The radiant power of the laser beam can be adjusted through the surface area of the shaping aperture and through the permeability of the shaping aperture. The permeability of the shaping aperture influences only the radiant power, whereas changes in the surface area besides the radiant power can also change the opening angle of the laser beam. For all aperture geometries of the shaping aperture the rule is that the surface area depends on the dimensions of the shaping aperture, which also determine the opening angle of the laser beam. The permeability of the shaping aperture creates the possibility to adjust the radiant power without changing the opening angle of the laser beam. The permeability of the shaping aperture is set, for example, through optical filters, designed as neutral density filters, also called gray filters, or as color filters. A color filter in a narrow wavelength range has a low transmission degree while shorter and longer wavelengths are almost completely allowed through. Optical quality glass or plastic plates are identified as neutral density filters, which are homogeneously colored neutral gray and achieve an even attenuation. With neutral density filters a broad wavelength range is attenuated, whereas with color filters a narrow wavelength range is attenuated around the wavelength of the beam source, i.e., ±15 nm. The radiant power of the laser beam can be set through the transmission degree of the optical filter. The ratio of radiant power allowed through to incident radiant power is defined as the transmission degree.

In a preferred further development of the device according to the invention there is provided a first laser beam shaping element that can be arranged in the path of the laser beam and is designed as a first shaping aperture, and a second laser beam shaping element that can be arranged in the path of the laser beam and is designed as a second shaping aperture, where the first and second shaping apertures differ from each other in the dimensions of the shaping apertures, in the surface area of the shaping apertures, and/or in the permeability of the shaping apertures. The use of different shaping apertures enables adaptation of the invention's device to different distance ranges in which a surface retroreflector is arranged and different sizes of surface retroreflectors. The opening angles of the shaped laser beams can be set through the dimensions of the shaping apertures. The larger the dimensions of the shaping aperture the smaller the opening angle of the shaped laser beam, and the larger the distance of the distance measurement device to the target object the smaller the opening angle of the laser beam should be.

In a preferred further development of the device according to the invention there is provided another laser beam shaping element that can be arranged in the path of the laser beam and that is designed as a transmission aperture array with at least one transmission aperture, with the at least one transmission aperture creating a partial beam and the partial beam expanding to one or more opening angles that are not smaller than a minimum critical angle of 1.0 mrad. A laser beam shaping element designed as transmission aperture array with at least one transmission aperture that creates a partial beam with opening angles greater than 1.0 mrad is suitable for optically measuring the distance from individual retroreflectors. The minimum critical angle of 1.0 mrad for the opening angle assures that a great expansion of the laser beam occurs with measuring the distance from an individual retroreflector. With opening angles greater than 1.0 mrad, a sufficient expansion of the partial beam is guaranteed so that the partial beam strikes the center of the individual retroreflector. If the partial beam does not hit the center of the individual retroreflector, there is a danger that the reflected reception beam misses the reception optical system and the detector of the distance measurement device because of parallel offset.

A transmission aperture is characterized by its surface area and its dimensions. The aperture geometry of the transmission aperture determines whether the partial beam has one opening angle or multiple opening angles. Transmission apertures with a circular or square transmission geometry are defined by one dimension (circle radius, side length of the square) and create partial beams behind the transmission aperture having a circular beam cross-section with an opening angle constant in the circumferential direction. Transmission apertures with an elliptical or rectangular aperture geometry are defined by two dimensions and generate partial beams behind the transmission aperture having an elliptical beam cross-section with an opening angle varying in the circumferential direction, with the opening angle of the elliptical partial beam varying in the circumferential direction between a maximum opening angle on the large semi-axis and a minimum opening angle on the small semi-axis of the elliptical beam cross-section. Transmission apertures with a random aperture geometry create partial beams behind the transmission aperture with multiple opening angles that lie between a minimum opening angle and a maximum opening angle.

The opening angles of the partial beam that the transmission aperture creates can be set through the dimensions of the transmission aperture. The minimum critical angle of 1.0 mrad can be converted to a maximum dimension for the transmission aperture that may not be exceeded if the opening angles of the partial beam should not fall below the minimum critical angle of 1.0 mrad. The smaller the dimensions of the transmission aperture, the larger the opening angles of the partial beam in the beam path behind the transmission aperture. To achieve good measurement performance in the distance measurement, it is advantageous in different distance ranges to use transmission apertures with different dimensions and therefore opening angles. The opening angle of the partial beam should decline with increasing distance, i.e., in the near area large opening angles are advantageous and at large distances opening angles in the area of the minimum critical angle of 1.0 mrad are advantageous.

Preferably, the transmission aperture array has multiple transmission apertures, with the transmission apertures creating multiple partial beams and each of the partial beams expanding to one or more opening angles that are not smaller than the minimum critical angle of 1.0 mrad. Use of multiple transmission apertures allows reduction of the necessary accuracy in orienting the laser beam to an individual retroreflector. After the transmission aperture the partial beam first has a small beam diameter, which in the near range would necessitate an exact orientation of the laser beam to the individual auto reflector. Given multiple transmission apertures, the diameters of the partial beams add up and enlarge the beam diameter. A central transmission aperture is suitable as transmission aperture array for measuring the distance from individual retroreflectors that, for example, is arranged coaxial to the optical axis of the laser beam before the transmission aperture array, with a ring-shaped distribution of other transmission apertures around the central transmission apertures. The partial beams that the multiple transmission apertures create and that overlap after the transmission aperture array to a laser beam should have the same opening angle, preferably an opening angle constant in the circumferential direction. The transmission apertures preferably have the same aperture geometry and the same dimensions.

Particularly preferably, the transmission apertures are designed partially permeable to the laser beam. The radiant power of the laser beam emitted is designed for the measuring the distance from scattering target objects in which only a small part of the radiant power is detected by the reception optical system and forwarded to the detector. With measuring the distance from an individual retroreflector, the laser beam is reflected at the target object and strikes the detector as a directed reception beam. To prevent overdrive of the detector, the radiant power of the reception beam incident on the detector must be much smaller than the radiant power of the laser beam emitted by the beam source. The radiant power of the laser beam can be adjusted through the transmission surface of the transmission aperture array and through the permeability of the transmission apertures. The transmission surface of a transmission aperture array is generally defined as the sum of the individual surface areas of the transmission apertures. If the transmission apertures have the same dimensions, the transmission area can also be calculated as the product of the number of transmission apertures and the surface area of the transmission apertures.

The permeability of the transmission apertures influences only the radiant power, whereas changes in the transmission surface besides the radiant power can also change the opening angles of the partial beams. For all aperture geometries of the transmission apertures the surface area depends on the dimensions of the transmission apertures, which also determine the opening angles of the partial beams. The permeability of the transmission apertures creates the possibility to adjust the radiant power without changing the opening angle of the partial beams. The permeability of the transmission apertures can be set, for example, through optical filters designed as neutral density filters or as color filters. The radiant power of the laser beam can be set through the transmission degree of the optical filter.

In a preferred further development of the device according to the invention there are provided a first transmission aperture array, which can be arranged in the path of the laser beam and has at least one first transmission aperture, and a second transmission aperture array, which can be arranged in the path of the laser beam and has at least one second transmission aperture, where the first and second transmission aperture arrays are different from each other. The use of different transmission aperture arrays enables adjustment of the invention's device to optically measuring the distance from different distance ranges in which individual retroreflectors are arranged, and to different sizes of individual retroreflectors. The number of transmission apertures, the surface area of the transmission apertures, the dimensions of the transmission apertures, and/or the permeability of the transmission apertures in particular are suited for adjustment of the invention's device to the distance range of an individual retroreflector.

It is particularly preferred that the first and second transmission aperture arrays differ from each other in the dimensions of the transmission apertures. The opening angles of the partial beams can be adjusted through the dimensions of the transmission apertures. The use of different dimensions enables adjustment of the transmission aperture arrays to different distance ranges and different sizes of individual retroreflectors. The larger the distance to the target object the smaller the opening angle of the partial beams should be, with the opening angles of the partial beams in any case not being smaller than the minimum critical angle of 1.0 mrad.

It is particularly preferred that the first and second transmission aperture arrays differ from each other in the number of transmission apertures, in the surface area of the transmission apertures, and/or in the permeability of the transmission apertures. The reduction of the radiant power of the reception beam necessary with an individual retroreflector can be achieved through the transmission surface of the transmission aperture array and the permeability of the transmission arrays. The smaller the ratio of the transmission surface to the cross-section surface of the laser beam directly before the transmission aperture array, the smaller the transmitted share of the laser beam. In addition to the transmission surface, the radiant power of the laser beam can be adjusted through the permeability of the transmission apertures. For this the transmission apertures can be provided an optical filter; the radiant power of the laser beam can be set through the transmission degree of the optical filter.

In a preferred further development of the device according to the invention, a reception beam shaping element is provided that can be arranged in the path of the reception beam and is designed as a reception aperture array with at least one reception aperture. The reduction of the radiant power of the incident reception beam required with reflective target objects (individual retroreflector or surface retroreflector) can occur through the reception aperture array with at least one reception aperture. The radiant power of the reception beam can be set through the reception surface of the reception aperture array and the permeability of the reception apertures. The reception surface of a reception aperture array is generally defined as the sum of the individual surface areas of the reception apertures. If the reception apertures have the same dimensions, the reception surface can also be calculated as the product of the number of reception apertures and the surface area of the reception apertures. The smaller the ratio of the reception area to the cross-section area of the reception beam directly before the reception aperture array, the smaller the radiant power of the reception beam. Attenuation of the reception beam through a limitation of the reception surface is independent of the wavelength of the beam source, so that extraneous light, e.g., in the form of sunlight with a broad wavelength spectrum, can also be attenuated. The attenuation of extraneous light occurs without additional equipment expense.

Particularly preferably, the reception aperture array has multiple reception apertures that are spaced apart from each other. The use of a reception aperture array with multiple reception apertures distributed over the beam cross-section of the reception beam results in a homogenization of the reception beam. A homogenization is mainly suited for reception beams having a non-homogeneous distribution over the beam cross-section. The reception surface can be adjusted through the number of reception apertures and the surface area of the reception apertures.

Particularly preferably, the reception apertures are designed as partially permeable to the reception beam. Alternatively to the reception surface, or additionally to the reception surface, the radiant power of the reception beam can be reduced through the permeability of the reception apertures. The reception apertures are particularly preferably provided with an optical filter; the radiant power of the reception beam can be set through the transmission degree of the optical filter. Neutral density filters that attenuate a broad wavelength spectrum and besides the reception beam also attenuate an extraneous light are suitable as optical filters for the partially permeable reception apertures. The attenuation of extraneous light occurs with use of neutral density filters without additional equipment expense.

In a preferred further development, there are provided a first reception beam shaping element that can be arranged in the path of the reception beam and is designed as a first reception aperture array with at least one first reception aperture, and a second reception beam shaping element that can be arranged in the path of the reception beam and is designed as a second reception aperture array with at least one second reception aperture, where the first and second reception aperture arrays are different from each other. The use of different reception aperture arrays enables adjustment of the invention's device to different distance ranges where a reflective target object is arranged, to different types of reflective target objects (individual retroreflector or surface retroreflector), and to different sizes of reflective target objects. The number of reception apertures, the surface area of the reception apertures, and/or the permeability of the reception apertures are particularly suited for adjusting the invention's device to the distance range, type, and size of the reflective target object.

Particularly preferably, the first and second reception aperture arrays differ from each other in the number of reception apertures, the surface area of the reception apertures, and/or the permeability of the reception apertures. The radiant power of the reception beam can be adjusted through the reception surface of the reception aperture array and through the permeability of the reception apertures. The reception surface is set through the number of reception apertures and/or the surface area of the reception apertures. The smaller the ratio of the reception surface to the cross-section surface of the reception beam directly before the reception aperture array, the smaller the radiant power of the reception beam. The reception surface should be enlarged with increasing distance of a reflective target object from the distance measurement device. Alternatively or in addition to the reception surface of the reception aperture array, the radiant power of the reception beam can be adjusted through the permeability of the reception apertures. The reception apertures are particularly preferably provided with a neutral density filter, with the permeability of the reception apertures set through the transmission degree of the neutral density filter. The use of neutral density filters for attenuating the reception beam has the advantage that besides the reception beam extraneous light can also be attenuated. The attenuation of extraneous light occurs with use of neutral density filters without additional equipment expense.

In a first preferred further development of the device according to the invention, a laser beam shaping element designed as transmission aperture array and a reception beam shaping element designed as reception aperture array are arranged on a first shaping element, where the first shaping element can be arranged in the path of the laser beam and the path of the reception beam. The arrangement of a transmission aperture array and a reception aperture array on a first shaping element is suitable for the measuring the distance from individual retroreflectors and reduces the expense and need for space, since the transmission and reception aperture arrays are arranged jointly in the path of the laser beam and the reception beam. The transmission and reception aperture arrays can be arranged coaxial to each other or next to each other, with the suitable arrangement of the transmission and reception aperture arrays determined by the arrangement of the laser and reception beams.

In a second preferred further development of the device according to the invention, a laser beam shaping element designed as a shaping aperture and a reception beam shaping element designed as a reception aperture array are arranged on a second shaping element, where the second shaping element can be arranged in the path of the laser beam and the path of the reception beam. The arrangement of a shaping aperture and a reception aperture array on a second shaping element is suitable for measuring the distance from surface retroreflectors and reduces the expense and need for space, since the shaping aperture and the reception aperture array are arranged jointly in the path of the laser beam and the reception beam. The shaping aperture and reception aperture array can be arranged coaxial to each other or next to each other, with the suitable arrangement of the shaping aperture and reception aperture arrangement determined by the arrangement of the laser and reception beams.

Particularly preferably, at least one first shaping element and at least one second shaping element are provided. A device according to the invention having at least one first shaping element and at least one second shaping element is suitable for optically measuring distance to individual retroreflectors and surface retroreflectors. The first shaping element is designed for measuring the distance from individual retroreflectors and the second shaping element for measuring the distance from surface retroreflectors.

Particularly preferably, multiple first shaping elements and/or multiple second shaping elements are provided. With a device according to the invention having multiple first shaping elements, multiple second shaping elements, or multiple first and second shaping elements the beam-shaping properties of the laser and reception beam shaping elements can be adjusted to different distance ranges in which an individual retroreflector or a surface retroreflector is arranged. The first shaping elements are provided for optically measuring distance to individual retroreflectors, and the second shaping elements for optically measuring distance to surface retroreflectors.

Embodiments of the invention are described below based on the drawings. These do not necessarily represent the embodiments to scale; instead, where helpful for the explanation the drawings are produced in schematic and/or slightly distorted form. Regarding additions to the teachings directly evident from the drawings, reference is made to the relevant prior art. It must be kept in mind that various modifications and changes to the form and detail of an embodiment can be made without deviating from the general idea of the invention. The invention's features disclosed in the description, drawings and claims can be essential both individually and in any combination for the development of the invention. In addition, all combinations of at least two of the features described in the description, drawings and/or claims fall within the framework of the invention. The general idea of the invention is not restricted to the exact shape or detail of the embodiments shown and described below or restricted to a subject matter that would be restricted compared to the subject matter claimed in the claims. Where dimension areas are given, values lying inside the given boundaries are also disclosed as limit values and can be used and claimed randomly. For the sake of simplicity, the same reference signs are used below for identical or similar parts or parts with identical or similar function.

DETAILED DESCRIPTION OF THE DRAWINGS

Figure 1A:
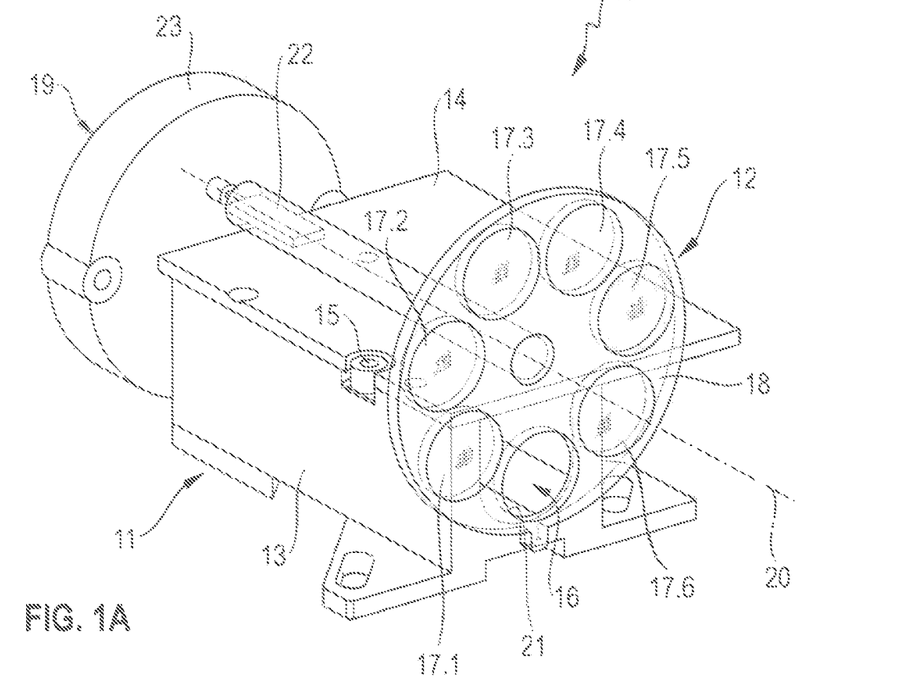
FIGS. 1A, B illustrate a device according to the invention for optically measuring the distance from a reflective target object consisting of a distance measuring device and a motor-adjustable adjustment device with laser and reception beam shaping elements.

FIG. 1A shows a device 10 according to the invention for optically measuring distance to a target object consisting of a distance measuring unit 11 and a motor-adjustable adjustment device 12 arranged outside the distance measuring unit 11. With target objects, a distinction is made between reflective target objects where an incident laser beam is primarily reflected and scattering target objects where an incident laser beam is primarily scattered.

With the reflective target objects, a distinction is additionally made between individual retroreflectors and surface retroreflectors. Reflective target objects are defined as individual retroreflectors that consist of a triple prism, with the dimensions of the prism being greater than the typical laser beam diameter and an incident laser beam hitting a surface of the triple prism. Examples of individual retroreflectors are triple prisms with diameters of 25 mm or 50 mm. Reflective target objects are defined as surface retroreflectors that consist of a plurality of prisms arranged next to each other in a level surface, with the dimensions of the prisms being smaller than the typical laser beam diameter and an incident laser beam striking multiple prisms. Examples of surface retroreflectors are reflective films and cat's eyes. Cat's eyes in the context of the application here are surface retroreflectors in which the ratio of the size of the prisms to the laser beam diameter is between 0.1 and 1.0, and reflective films are surface retroreflectors in which the ratio of the size of the prisms to the laser beam diameter is less than 0.1.

The distance measuring unit 11 comprises an optics carrier 13 and a circuit board 14, connected through a connecting device 15 with the optics carrier 13. In the distance measuring device 11 a laser beam is created that through a decoupling aperture 16 in the optics carrier 13 exits the distance measuring device 11 and hits the adjustment device 12. The laser beam is adjusted to the properties of the target object and the distance range to the target object with the aid of the adjustment device 12. In the embodiment the adjustment device 12 comprises six different shaping elements 17.1-17.6, which are fastened in a rotatable wheel 18 and are rotatable around a rotation axis 20 by means of a motor drive device 19.

The shaping elements 17.1-17.6 of the adjustment device 12 each has a laser beam shaping element for shaping the laser beam and a reception beam shaping element for shaping the reception beam; the shaping elements 17.1-17.6 differ in their diffraction properties and/or attenuation properties and are provided for distance measurement of reflective target objects in different distance ranges. The rotatable wheel 18 besides the six shaping elements 17.1-17.6 has another receptacle 21 into which no shaping element is inserted and no diffraction and/or attenuation of the laser beam and/or the reception beam takes place.

The rotatable wheel 18 is connected non-rotatably with an axle element 22 that is rotatable about the rotation axis 20 by a drive motor 23; the rotation angle of the drive motor 23 is detected by means of an angle sensor device. The drive of rotatable wheel 18 around the rotation axis 20 can alternatively take place through a manual rotation device. The rotatable wheel 18 can be arranged around the rotation axis 20 in seven angle positions by means of a rotation. In six angle positions one of the shaping elements 17.1-17.6 is arranged in the laser beam and in the seventh angle position all shaping elements 17.1-17.6 are arranged outside the laser beam and outside the reception beam. The seventh angle position is provided for the measuring the distance from scattering target objects.

Figure 1B:
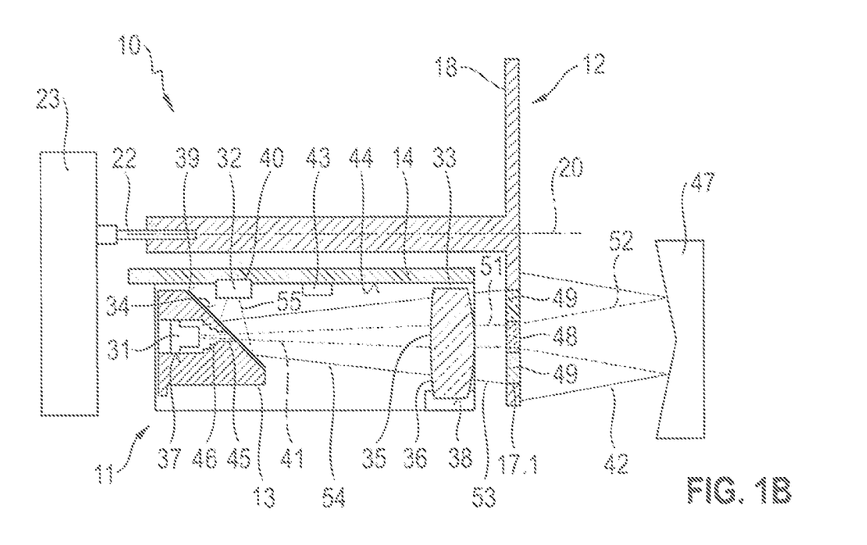

FIG. 1B shows the structure of the distance measuring device 11 and the motor-adjustable adjustment device 12 of the invention's device 10 for optically measuring distance of FIG. 1A in detail.

The distance measuring device 11 comprises a first electro-optical component designed as beam source 31, a second electro-optical component designed as detector 32, a beam shaping system 33, a beam splitting optical system 34, the optics carrier 13 and the circuit board 14. The beam shaping system 33 comprises a transmission optical system 35 for the shaping of the laser beam and a reception optical system 36 for the shaping of the reception beam that are integrated into a shared beam shaping optical system 33. The beam source 31, beam shaping optical system 33 and beam splitting optical system 34 are fastened to the optics carrier 13 and detector 32 is fastened to circuit board 14. The optics carrier 13 has a first receptacle 37 for the beam source 31, a second receptacle 38 for the beam shaping optical system 33, and a third receptacle 39 for the beam splitting optical system 34. Detector 32 is fastened on circuit board 14 in another receptacle 40.

The beam source 31 is designed as a laser diode that generates a visible or infrared laser beam 41. The detector 32 is designed as a photodiode that receives the reception beam 42 reflected and/or scattered by the target object. The beam splitting optical system 34 separates the laser beam from the coaxially running reception beam, it is arranged in the path of the laser beam between beam source 31 and beam shaping optical system 33 and in the path of the reception beam between beam shaping optical system 33 and detector 32. The beam splitting optical system 41 can be designed, for example, as a polarization beam splitter, perforated mirror, or other beam-splitting optical element. A control and evaluation device 43 is connected with the beam source 31 and detector 32 and determines the distance to the target object from a time difference between a reference beam and the reception beam.

Detector 32 is arranged on a front side 44 of circuit board 14 facing optics carrier 13 and firmly connected with circuit board 14 through a solder connection; detector 32 can be automatically assembled and soldered, for example, in the manufacture of circuit board 14. Detector 32 is held mechanically solely by circuit board 14, there are no connecting means present directly connecting detector 32 with optics carrier 13. Optics carrier 13 is designed open on a side facing detector 32 and connected by a contact surface through connecting device 15 with circuit board 14. The connection device 15 is designed to be detachable while aligning the distance measuring device 11.

An aperture 45 is arranged in the path of laser beam 41 between the beam source 31 and the beam splitting optical system 33 that is integrated into the monolithic optics carrier 13. The aperture 45 serves to limit the opening angle of the beam source 31 and adjust the geometry of laser beam 41 to beam splitting optical system 34 and beam shaping optical system 33. Between beam source 31 and aperture 45 is arranged a light trap 46 that, like aperture 45, is integrated into the monolithic optics carrier 13. The light trap 46 serves to absorb incident light and prevent undesired reflections. For this light trap 46 has a low-reflection, absorbent coating on the inside. The aperture 45 and light trap 46 reduce optical and electrical crosstalk from beam source 31 to detector 32 well as disturbing artifacts in the laser beam.

A reflective target object designed as individual retroreflector 47 is used as target object in the embodiment of FIG. 1B that is located a short distance from distance measuring device 11. The first shaping element 17.1 is located in the path of laser beam 41 and reception beam 42. First shaping element 17.1 has a laser beam shaping element 48 for laser beam 41 and a reception beam shaping element 49 for reception beam 42.

Beam source 31 emits laser beam 41, which is aimed at beam splitting optical system 34. The greatest possible part of laser beam 41 is transmitted at beam splitting optical system 34 and hits transmission optical system 35, where a first beam shaping occurs. The first transmission optical system 35 is designed as a collimating lens that collimates laser beam 41 and directs it as collimated laser beam 51 to laser beam shaping element 48. The optical properties of collimating lens 35 are adapted to the distance measurement of scattered target objects. The collimated laser beam 51 hits laser beam shaping element 48 where the beam shaping and attenuation of the collimated laser beam 51 take place. The shaped laser beam 52 hits the reflective target object 47.

The reception beam 42 reflected at target object 47 hits the reception beam shaping element 49 that diffracts reception beam 42, attenuates it, and directs it as shaped reception beam 53 to reception optical system 36. A further beam shaping of the shaped reception beam 53 takes place at reception optical system 36. The twice-shaped reception beam 54 is aimed at beam splitting optical system 34 and deflected at beam splitting optical system 34. The deflected reception beam 55 hits detector 32. Beam splitting optical system 34 assures that the optical axis of the deflected reception beam 55 and the optical axis of the emitted laser beam 41 differ from each other.

Figure 2A:
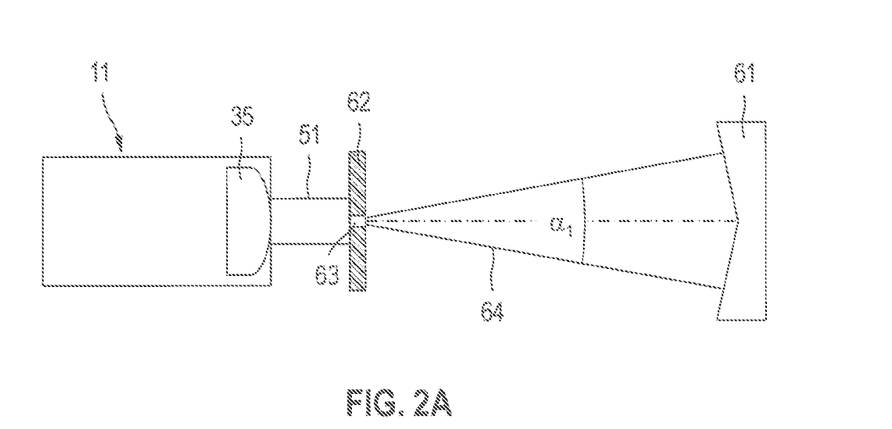
FIGS. 2A, B illustrate optical measuring the distance from an individual retroreflector with the aid of the device shown in FIG. 1, comprising a transmission aperture array with a transmission aperture (FIG. 2A) or a transmission aperture array with multiple transmission apertures (FIG. 2B)
Figure 2B:
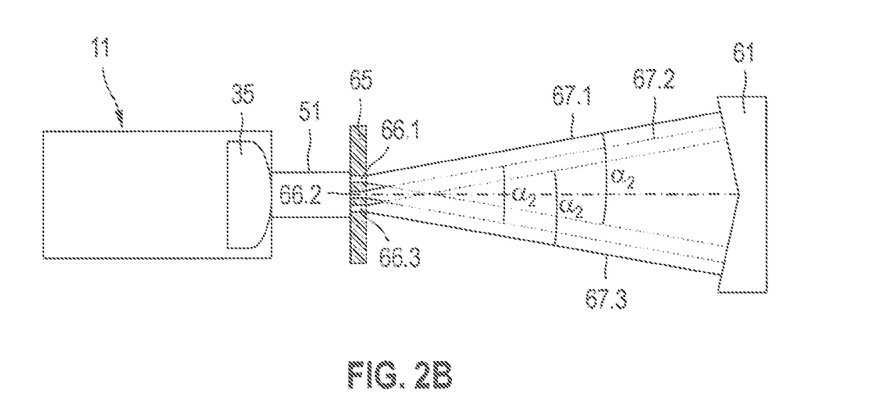

FIGS. 2A, B schematically show optically measuring the distance from an individual retroreflector 61 with the help of device 10 shown in FIG. 1. The adjustment of the laser beam to individual retroreflector 61 is done by means of a laser beam shaping element designed as transmission aperture array with a transmission aperture (FIG. 2A) or as transmission aperture array with multiple transmission apertures (FIG. 2B).

The distance measurement device 11 creates the collimated laser beam 51 with the help of transmission optical system 35. In the beam path of collimated laser beam 51 is arranged a first laser beam shaping element 62 designed for the measuring the distance from individual retroreflectors. With individual retroreflectors the center of the retroreflector should be hit by the laser beam so that in each case the reflected reception beam hits the reception optical system 36 and is registered by detector 32. If the laser beam does not hit the center of the individual retroreflector, the reflected reception beam can miss the reception optical system 36 due to parallel offset. To reduce the accuracy with which the laser beam must be aimed at the individual retroreflector 61, the laser beam is widened.

The first laser beam shaping element is designed as a first transmission aperture array 62 with a first transmission aperture 63. First transmission aperture 63 has a circular aperture geometry with a circle radius. The first transmission aperture 63 creates a partial beam 64 and widens partial beam 64 to a first opening angle $\alpha_1$ that is greater than a minimum critical angle $\alpha_{min}$ of 1.0 mrad. The first opening angle $\alpha_1$ of partial beam 64 can be set through the circle radius of the first transmission aperture 63; the smaller the circle radius of the first transmission aperture 63, the larger the first opening angle $\alpha_1$ of the partial beam. The first transmission aperture 63 also causes the radiant power of the laser beam to be greatly reduced.

A transmission aperture is characterized by its surface area and dimensions. The minimum critical angle $\alpha_{min}$ in of 1.0 mrad can be converted to a maximum dimension for the transmission aperture that the transmission aperture may not go below. The aperture geometry of the transmission aperture determines whether the partial beam has one opening angle or multiple opening angles. Transmission apertures with a circular or square aperture geometry are defined by the dimension (circle radius, side length of the square) and create behind the transmission aperture partial beams having a circular beam cross-section with an opening angle constant in the circumferential direction. Transmission apertures with an elliptical or rectangular aperture geometry are defined by two dimensions and create behind the transmission aperture partial beams having an elliptical beam cross-section with an opening angle varying in the circumferential direction, with the opening angle in the circumferential direction varying between a maximum opening angle on the large half-axis and a minimum opening angle on the small half-axis of the elliptical beam cross-section. Transmission apertures with a random aperture geometry create behind the transmission aperture partial beams with multiple opening angles that lie between a minimum opening angle and a maximum opening angle.

After the first transmission aperture 63 the partial beam 64 initially has a small beam diameter that in the close range would necessitate an exact orientation of partial beam 64 to individual retroreflector 61. To reduce the required accuracy with which partial beam 64 must be directed at individual retroreflector 61, the second laser beam shaping element 65 shown in FIG. 2B can be used. The second laser beam shaping element is designed as second transmission aperture array 65 with three second transmission apertures 66.1, 66.2, 66.3. The second transmission apertures 66 each generate a partial beam 67.1, 67.2, 67.3 and widened the partial beams 67,1-67.3 to a second opening angle $\alpha_2$, which is greater than the minimum critical angle $\alpha_{min}$ of 1.0 mrad. Examples of a suitable arrangement of the second transmission apertures 66.1-66.3 are a central second transmission aperture arranged coaxial to the optical axis of collimated laser beam 51 and a ring-shaped distribution of further second transmission apertures around the central second transmission aperture. The second opening angle $\alpha_2$ of the partial beams 67.1-67.3 can be set through the circle radius of the second transmission apertures 66.1-436.3; the smaller the circle radius of the second transmission apertures 66.1-66.3, the greater the second opening angle $\alpha_2$ of the partial beams 67.1-67.3.

The radiant power of the laser beam after the transmission aperture array can be adjusted through the transmission surface of the transmission aperture array and the permeability of the transmission apertures. The transmission surface of a transmission aperture array is generally defined as the sum of the individual surface areas of the transmission apertures. If the transmission apertures have the same dimensions, the transmission area can also be calculated as the product of the number of transmission apertures and the surface area of the transmission apertures. The smaller the ratio of the transmission area to the cross-section area of the laser beam directly before the transmission aperture array, the smaller the radiant power of the transmitted portion of the laser beam after the transmission aperture array.

Figure 3:
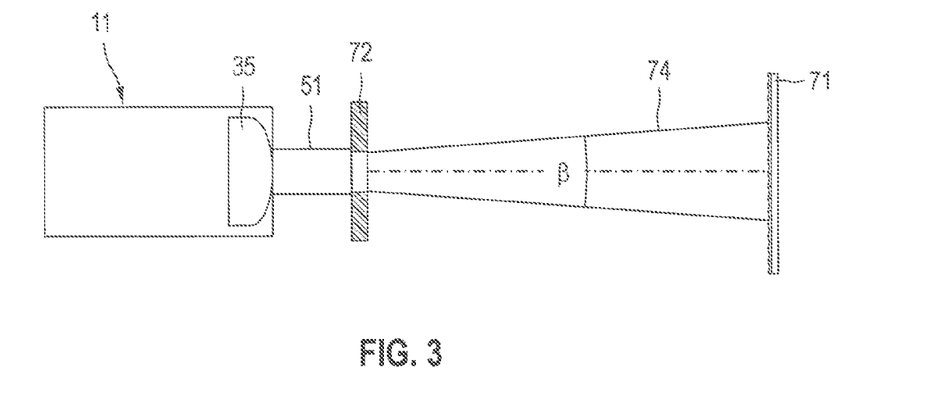
FIG. 3 illustrates optical measuring the distance from a surface retroreflector with the aid of the device shown in FIG. 1.

FIG. 3 schematically shows optically measuring the distance from a surface retroreflector 71 with the aid of the device 10 shown in FIG. 1. The distance measurement device 11 with the help of the transmission optical system 35 creates the collimated laser beam 51. In the path of the collimated laser beam 51 is arranged a laser beam shaping element 72 designed for the measuring the distance from surface retroreflectors.

The laser beam shaping element 72 is designed as a shaping aperture with a circular aperture geometry. Shaping aperture 72 shapes the incident laser beam 51 into a shaped laser beam 74 with an opening angle β, with the opening angle it of the shaped laser beam 74 being smaller than a maximum critical angle $\beta_{max}$ of 0.3 mrad. Opening angle β of shaped laser beam 74 can be set through the circle radius of shaping aperture 72; the larger the circle radius of shaping aperture 72, the smaller the opening angle β of shaped laser beam 74.

A shaping aperture is characterized by its surface area and its dimensions. The maximum critical angle $\beta_{max}$ of 0.3 mrad can be converted to a minimum dimension for the shaping aperture that the shaping aperture may not go below. The aperture geometry of the shaping aperture determines whether the shaped laser beam has one opening angle or multiple opening angles. Shaping apertures with a circular or square aperture geometry are defined by one dimension (circle radius, side length of the square) and create laser beams having a circular beam cross-section with an opening angle constant in the circumferential direction. Shaping apertures with an elliptical or rectangular aperture geometry are defined by two dimensions and create laser beams having an elliptical beam cross-section with an opening angle varying in the circumferential direction, with the opening angle of the elliptical laser beam in the circumferential direction varying between a maximum opening angle on the large half-axis and a minimum opening angle on the small half-axis of the elliptical beam cross-section. Shaping apertures with a random aperture geometry create after the shaping aperture laser beams with multiple opening angles that lie between a minimum opening angle and a maximum opening angle.

Figure 4A:
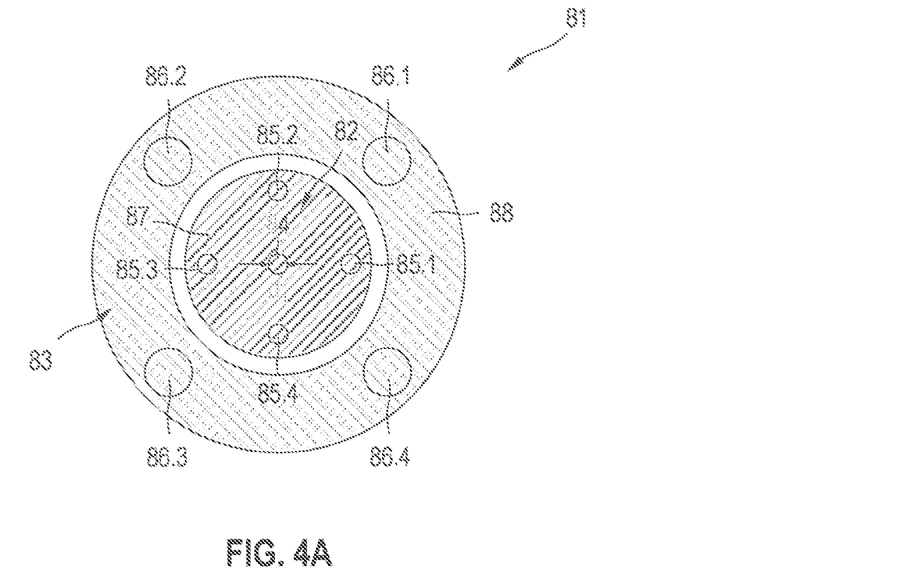
FIGS. 4A, B illustrate a first and a second embodiment of a first shaping element with laser and reception beam shaping elements for optically measuring distance to individual retroreflectors in different distance ranges.
Figure 4B:
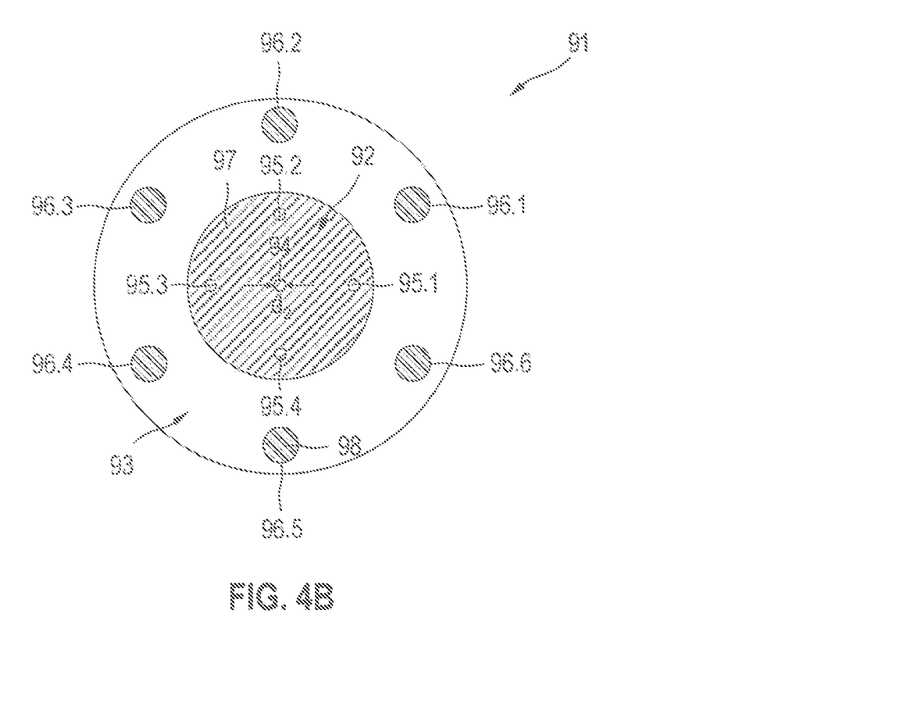

FIGS. 4A, B show a first and a second embodiment of a first shaping element with laser and reception beam shaping elements designed for optically measuring distance to individual retroreflectors in different distance ranges. The distance measurement is done, for example, with the aid of the device 10 shown in FIG. 1.

FIG. 4A shows a first embodiment of a first shaping element 81 having a laser beam shaping element 82 and a reception beam shaping element 83. The laser beam shaping element 82 is designed as a transmission aperture array with five transmission apertures 84, 85.1-85.4, which subdivide the incident laser beam into five partial beams. The transmission apertures 84, 85.1-85.4 have a circular aperture geometry with a first diameter $d_1$ and expand the partial beams by diffraction to an opening angle of 1.0 mrad. The reception beam shaping element 83 is designed as a reception aperture array with four reception apertures 86.1-86.4, distributed ring-shaped around the laser beam shaping element 82. The reception apertures 86.1-86.4 have a circular aperture geometry with the same diameter.

The radiant power of the emitted laser beam 41 is designed for measuring the distance from scattering target objects. With scattering target objects the laser beam is scattered over a large angle area, only a small part of the radiant power is detected by the reception optical system 36 and forwarded to detector 32. With measuring the distance from reflective target objects, the laser beam is reflected at the target object and hits detector 32 as a directed reception beam. To prevent an overdrive of detector 32 in measuring the distance from reflective target objects, the radiant power of reception beam 42 incident on detector 32 must be much less than the radiant power of the laser beam 41 emitted by beam source 31. The reduction of the radiant power can occur through measures in the path of laser beam 41 and/or through measures in the path of reception beam 42.

The radiant power of laser beam 41 can be set through the transmission surface of transmission aperture array 82 and through the permeability of transmission arrays 84, 85.1-85.4. The transmission surface of a transmission aperture array is generally defined as the sum of the individual surface areas of the transmission apertures. If as in the embodiment the transmission apertures have the same dimensions, the transmission surface can also be calculated as the product of the number of transmission apertures and the surface unit of the transmission apertures. The smaller the ratio of the transmission surface to the cross-section area of laser beam 41 directly before transmission aperture array 82, the smaller the radiant power of laser beam 41 after transmission aperture array 82.

Alternatively or in addition to the transmission surface, the radiant power of laser beam 41 can be set through the permeability of transmission apertures 84, 85.1-85,4. In the embodiment the transmission apertures 84, 85.1-85.4 have an optical filter 87 designed, for example, as a neutral density filter or color filter. The attenuation of the laser beam can be set through the transmission degree of the optical filter, defined as the ratio of radiant power allowed through to the incident radiant power of the laser beam. The permeability of transmission apertures 84, 85.1-85.4 influences only the radiant power of laser beam 41, whereas the transmission surface, which depends on the dimensions of the transmission apertures 84, 85.1-85.4, changes the radiant power and the opening angle of the partial beams. The permeability of the transmission apertures 84, 85.1-85.4 creates the possibility to reduce the radiant power of laser beam 41 without changing the opening angle of the partial beams.

The radiant power of reception beam 42 can be set through the reception surface of reception aperture array 83 and through the permeability of reception apertures 86.1-86.4. The reception surface of a reception aperture array is generally defined as the sum of the individual surface areas of reception apertures 86.1-86.4. If as in the embodiment the reception apertures have the same dimensions, the reception surface can also be calculated as the product of the number of reception apertures and the surface area of the reception apertures. The smaller the ratio of the reception surface to the cross-section surface of reception beam 42 directly before reception aperture array 83, the lower the radiant power of reception beam 42 after reception aperture array 83. The attenuation of reception beam 42 through a restriction of the reception surface is dependent on the wavelength of beam source 31, so that extraneous light, such as sunlight with a broad wavelength spectrum, can also be attenuated without additional effort.

Alternatively or in addition to the reception surface, the radiant power of reception beam 42 can be adjusted through the permeability of reception apertures 86.1-86.4. In the embodiment the reception apertures 86.1-86.4 are equipped with an optical filter 88 designed, for example, as neutral density filter or color filter. The attenuation of the reception beam can be set through the transmission degree of the optical filter, defined as the ratio of radiant power allowed through to incident radiant power of the reception beam.

The optical filters 87, 88 are designed as neutral density filters or color filters. With neutral density filters a wide wavelength range is attenuated, whereas with color filters a narrower wavelength range around the wavelength of beam source 31 is attenuated. Attenuating the radiant power through the permeability of an aperture (transmission aperture or reception aperture) offers the possibility to adapt the radiant power without changing the opening angles of the diffracted beams. Using neutral density filters has the advantage that besides the wavelength of beam source 31 a wide wavelength range is attenuated that also comprises extraneous light. Neutral density filters are therefore especially suitable if extraneous light should also be attenuated. In addition, neutral density filters have the advantage of being inexpensively available as plastic films.

FIG. 4B shows a second embodiment of a first shaping element 91 having a laser beam shaping element 92 and reception beam shaping element 93. The laser beam shaping element 92 is designed as a transmission aperture array with five circular transmission arrays 94, 95.1-95.4, arranged analogous to the transmission apertures 84, 85.1-85.4 of FIG. 4A around the optical axis of the collimated laser beam 51. Reception beam shaping element 93 is designed as a reception aperture array with six circular reception apertures 96.1-96.6, arranged ring-shaped around laser beam shaping element 92.

Transmission apertures 94, 95.1-95.4 of FIG. 4B differ in diameter from the transmission apertures 84, 85.1-85.4 of FIG. 4A. In the embodiment the transmission apertures 94, 95.1-95.4 have a second diameter $d_2$ and expand the five partial beams to an opening angle of 2.0 mrad. The circular reception apertures 96.1-96.6 of FIG. 4B have a smaller diameter than the circular reception apertures 86.1-86.4 of FIG. 4A. Transmission apertures 94, 95.1-95.4 and reception apertures 96.1-96.6 are designed as partially permeable. The transmission apertures 94, 95.1-95.4 are equipped with an optical filter 97 and the reception apertures 96.1-96.6 with an optical filter 98. The radiant power hitting detector 32 can be adjusted through the transmission degree of optical filters 97, 98.

Transmission apertures 84, 83.1-85.4, 94, 95.1-95.4 and reception apertures 86.1-86.4, 96.1-96.6 have circular aperture geometries. Circular transmission and reception apertures are the preferred aperture geometry. The transmission apertures 84, 85.1-85.4 of FIG. 4A have a diameter $d_1$ and produce partial beams with an opening angle of 1.0 mrad constant in the circumferential direction. Transmission apertures 94, 95.1-95.4 of FIG. 4B have a diameter $d_2$ and produce partial beams with an opening angle of 2.0 mrad constant in the circumferential direction. In principle, transmission and reception apertures with a non-circular transmission geometry can also be used. With transmission and reception apertures with an elliptical or rectangular aperture geometry the beams after the aperture array have an elliptical beam cross-section with opening angles varying in the circumferential direction.

Figure 5A:
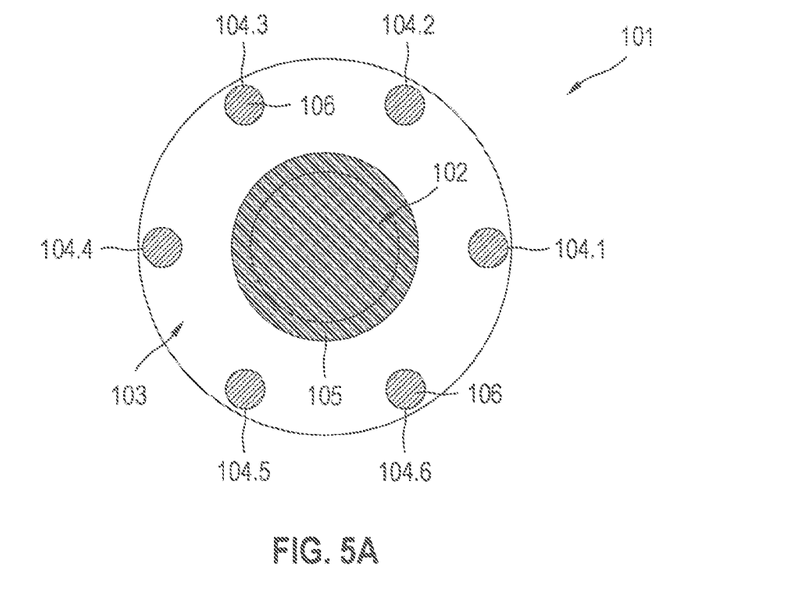
FIGS. 5A, B illustrate a first and a second embodiment of a second shaping element with laser and reception beam shaping elements for optically measuring distance to surface retroreflectors in different distance ranges.
Figure 5B:
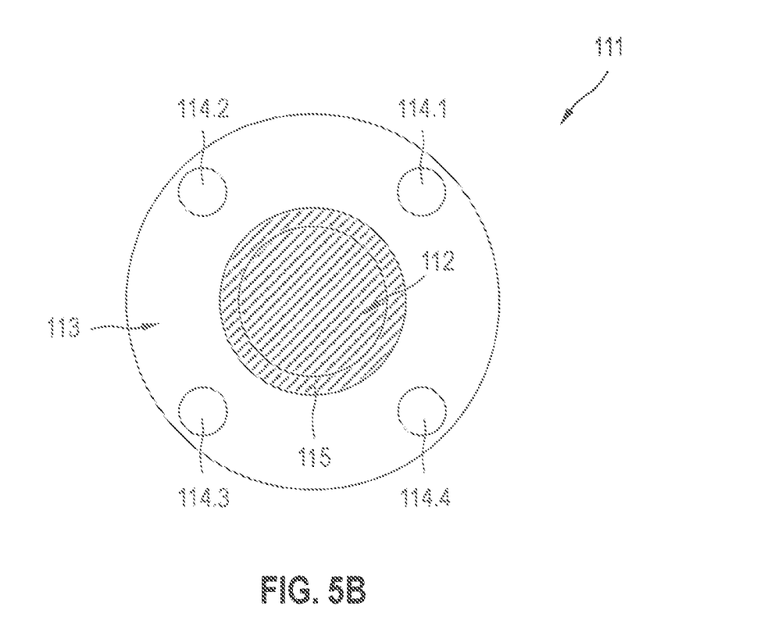

FIGS. 5A, B show a first and a second embodiment of a second shaping element with laser and reception beam shaping elements designed for optically measuring distance to surface retroreflectors in different distance ranges. The distance measurement is done, for example, with the aid of the device 10 shown in FIG. 1.

FIG. 5A shows a first embodiment of a second shaping element 101 having a laser beam shaping element 102 and a reception beam shaping element 103. Laser beam shaping element 102 is designed as a first shaping aperture that homogenizes the incident laser beam and converts it to a shaped laser beam with a first opening angle $\beta_1$. A diffraction of the laser beam cannot be fully avoided; the first opening angle $\beta_1$ of the shaped laser beam is smaller than the maximum critical angle $\beta_{max}$ of 0.3 mrad. The reception beam shaping element 103 is designed as a reception aperture array with six circular reception arrays 104.1-104.6, arranged ring-shaped around the laser beam shaping element 102.

The reduction of the radiant power of the incident reception beam required with surface retroreflectors can occur through shaping aperture 102 and reception apertures 104.1-104.6. The radiant power of laser beam 41 can be set through the surface area and the permeability of shaping aperture 102, and the radiant power of reception beam 42 through the reception area of reception aperture array 103 and the permeability of reception apertures 104.1-104.6. In the embodiment the shaping aperture 102 and reception apertures 104.1-104.6 are designed as partially permeable. Shaping aperture 102 is equipped with an optical filter 105, and reception apertures 104.1-104.6 are equipped with an optical filter 106.

FIG. 5B shows a second embodiment of a second shaping element 111 having a laser beam shaping element 112 and a reception beam shaping element 113. The laser beam shaping element 112 is designed as a second shaping aperture that homogenizes the incident laser beam and converts it to a shaped laser beam with a second opening angle $\beta_2$. The reception beam shaping element 113 is designed as a reception aperture array with four circular reception apertures 114.1-114.4, arranged ring-shaped around the laser beam shaping element 112. The reception apertures 114.1-114.4 of FIG. 5B have a larger diameter than the reception apertures 104.1-104.6 of FIG. 5A.

The second shaping aperture 112 is designed as partially permeable to the wavelength of the laser beam. For this the shaping aperture 112 is equipped with an optical filter 115, which in the range of the laser beam's wavelength has a transmission degree less than 100%, for example 20%. The reception apertures 114.1-114.4 in the embodiment are designed fully permeable to the reflected reception beam. Alternatively, the reception apertures 114.1-114.4 can be designed partially permeable to the reflected reception beam. The radiant power of the reception beam hitting detector 32 can be set, in addition to the reception surface of the reception aperture array 113, through the permeability of reception arrays 114.1-114.4.

The shaping apertures 102, 112 and the reception apertures 104.1-104.6, 114.1-114.4 have circular aperture geometries. Circular shaping and reception apertures are the preferred aperture geometry. The shaping apertures 102, 112 have a circular diameter and generate partial beams with an opening angle constant in the circumferential direction. In principle, shaping and reception apertures with a non-circular aperture geometry can also be used. With shaping and reception apertures with an elliptical or rectangular aperture geometry, the beams after the apertures have a beam cross-section with opening angles varying in the circumferential direction.

Figure 6:
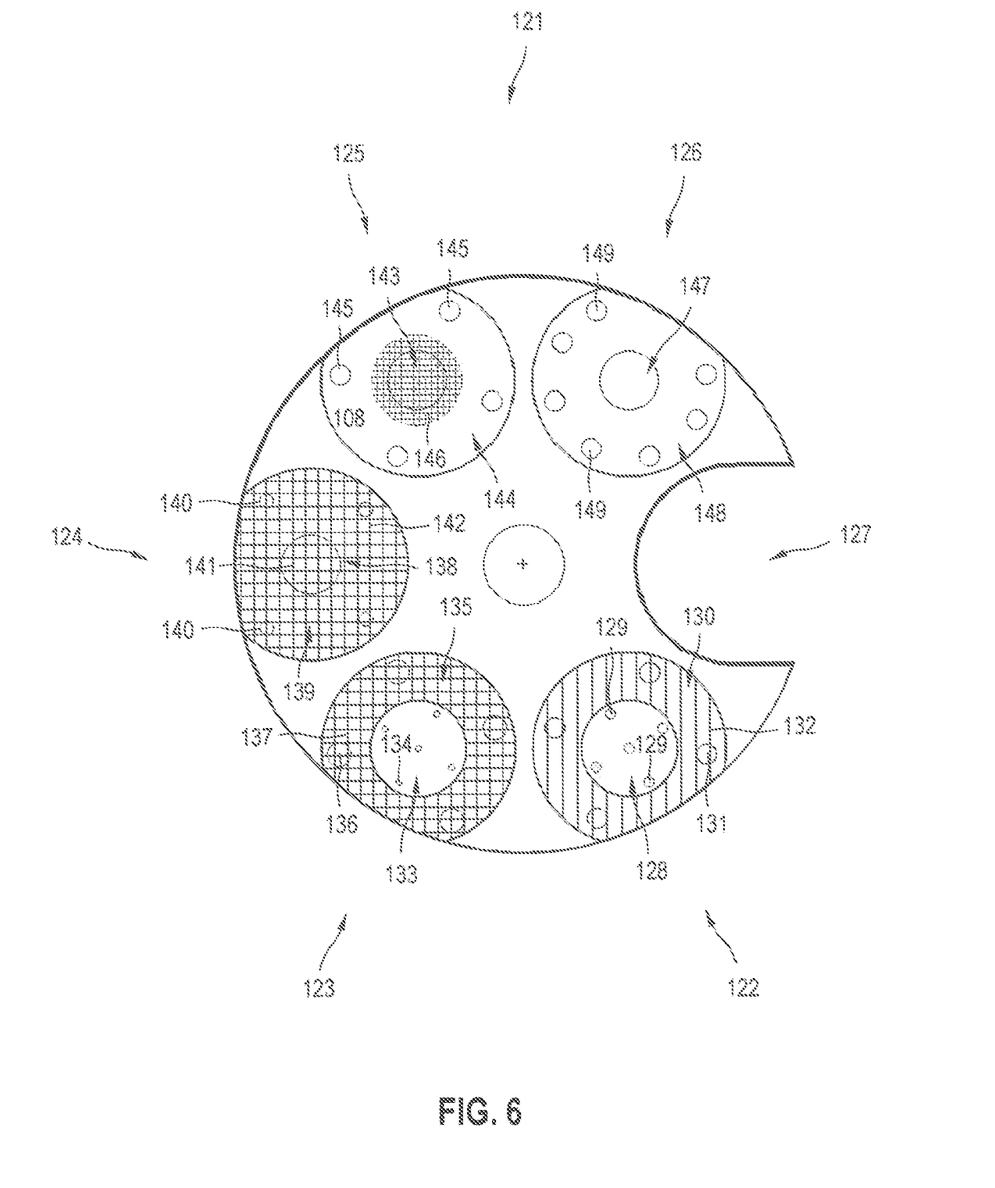
FIG. 6 illustrates a first embodiment of an adjustment device with two first shaping elements designed for optically measuring distance to individual retroreflectors, and three second shaping elements designed for optically measuring distance to surface retroreflectors.

FIG. 6 shows a first embodiment of an adjustment device 121 with two first shaping elements 122, 123 designed for optically measuring distance to individual retroreflectors three second shaping elements 124, 125, 126 designed for optically measuring distance to surface retroreflectors, and a beam passage 127 designed for measuring the distance from scattering target objects. The distance measurement is done, for example, with the aid of the device 10 shown in FIG. 1.

The first shaping element 122 comprises a laser beam shaping element 128 designed as a transmission aperture array with five circular transmission apertures 129, and a reception beam shaping element 130 designed as a reception aperture array with four circular reception apertures 131, with the reception aperture 131 equipped with an optical filter 132 and designed partially permeable to the reflected reception beam. The other, first shaping element 123 comprises a laser beam shaping element 133 designed as a transmission aperture array with five circular transmission arrays 134, and a reception beam shaping element 136 designed as a reception aperture array 135 with four circular reception apertures, with the reception aperture 136 equipped with an optical filter 137 and designed partially permeable to the reflected reception beam.

The first shaping elements 122, 123 differ from each other in the diameter of the transmission apertures 129, 134, in the diameter of the reception apertures 131, 136, and in the permeability of the reception apertures 131, 136. The first shaping element 122 is provided, for example, for distance measurements in the distance range of 30 m to 100 m, and the first shaping element 123 is provided for distance measurements in the distance range of up to 30 m.

The second shaping element 124 comprises a laser beam shaping element 138 designed as a circular shaping aperture and a reception beam shaping element 139 designed as a reception aperture array with four circular reception arrays 140. The shaping aperture 138 is designed partially permeable to the laser beam by means of an optical filter 141, and the reception apertures 140 are designed as partially permeable to the reflected reception beam by means of an optical filter 142. The other, second shaping element 125 comprises a laser beam shaping element 143 designed as a circular shaping aperture and a reception beam shaping element 144 designed as a reception aperture array with four circular reception apertures 145, with the shaping aperture 143 designed as partially permeable to the laser beam by means of an optical filter 146. The other, second shaping element 126 comprises a laser beam shaping element 147 designed as a circular shaping aperture and a reception beam shaping element 148 designed as a reception aperture array with seven circular reception apertures 149, with the shaping aperture 147 and the reception apertures 149 designed partially permeable to the laser beam and the reception beam.

The second shaping elements 124, 125, 126 differ from each other in the diameter of the shaping aperture 138, 143, 147, in the permeability of the shaping aperture 138, 143, 147, in the diameter of the reception apertures 140, 145, 149, in the number of reception apertures 140, 145, 149, and/or in the permeability of the reception apertures 140, 145, 149. The second shaping element 124 is provided, for example, for distance measurements to cat's eyes in the distance range of up to 10 m, the second shaping element 125 for distance measurements to cat's eyes in the distance range from 10 m to 100 m, and the second shaping element 126 for distance measurements to cat's eyes in the distance range over 100 m. The distance ranges indicated are examples of well-reflecting cat's eyes and depend on the quality of the surface retroreflector. The applicable rule is that the attenuation of the laser beam and the reception beam should grow less with declining quality of the surface retroreflector.

Figure 7A:
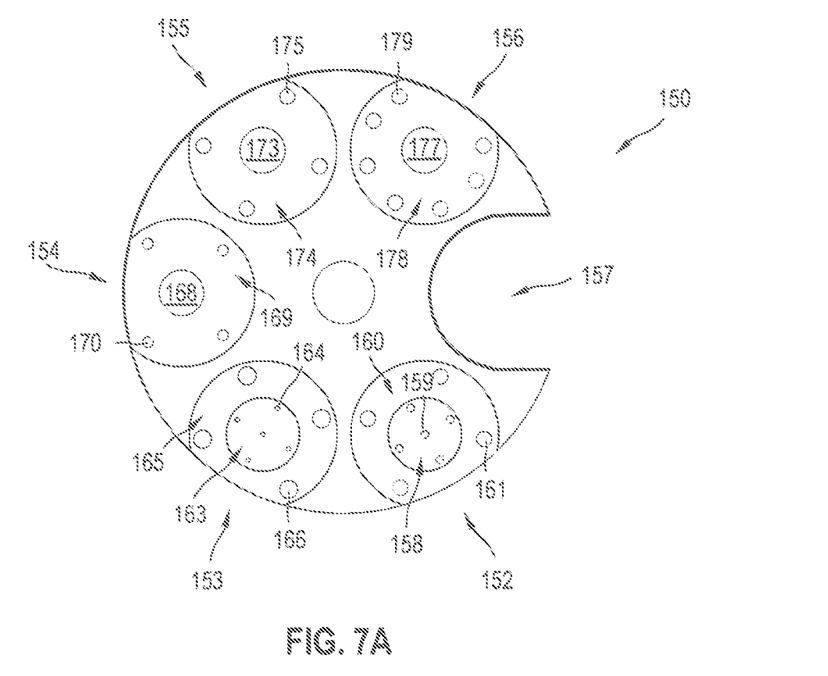
FIGS. 7A, B illustrate a second embodiment of an adjustment device with multiple laser and reception beam shaping elements arranged in a first rotatable wheel, and multiple attenuation elements arranged in a second rotatable wheel.
Figure 7B:
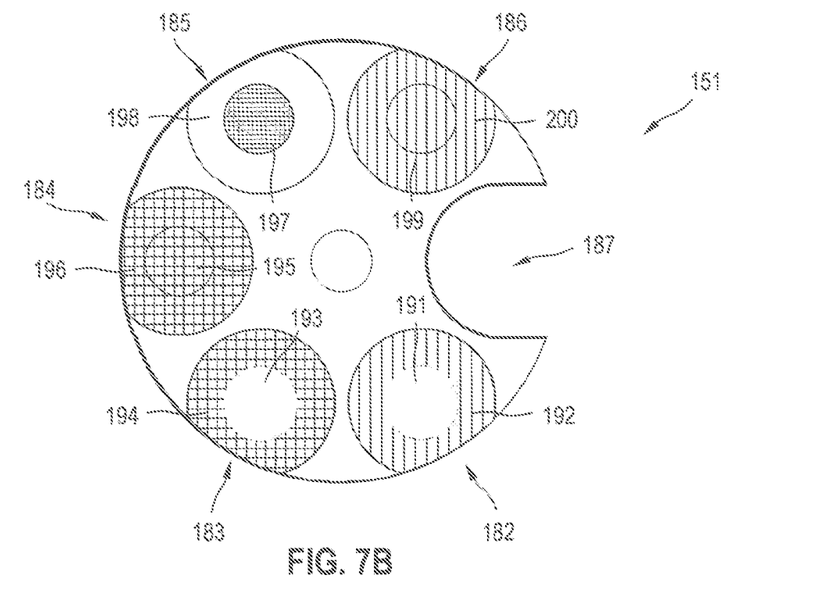

FIGS. 7A, B show a second embodiment of an adjustment device with a first adjustment device 150 (FIG. 7A) and a second adjustment device 151 (FIG. 7B, with the first adjustment device 150 having first shaping elements for measuring the distance from individual retroreflectors and second shaping elements for measuring the distance from surface retroreflectors and the second adjustment device 151 having attenuation elements for attenuating the radiant power of the laser and/or reception beam. The distance measurement is done, for example, with the aid of the device 10 shown in FIG. 1.

The first adjustment device 150 comprises two first shaping elements 152, 153 designed for optically measuring distance to individual retroreflectors, three second shaping elements 154, 155, 156 designed for optically measuring distance to surface retroreflectors, and a beam passage 157 designed for measuring the distance from scattering target objects. The first shaping element 152 comprises a laser beam shaping element 158 designed as a transmission aperture array with five circular transmission apertures 159, and a reception beam shaping element 160 designed as a reception aperture array with four circular reception apertures 161. The other, first shaping element 153 comprises a laser beam shaping element 163 designed as a transmission aperture array with five circular transmission apertures 164 and a reception beam shaping element 166 designed as a reception aperture array 165 with four circular reception apertures.

The first shaping elements 152, 153 differ from each other in the diameter of the transmission apertures 159, 164 and in the diameter of the reception apertures 161, 166. The first shaping element 152 is provided, for example, for distance measurements in the distance range of 30 m to 100 m, and the first shaping element 153 for distance measurements in the distance range of up to 30 m.

The second shaping element 154 comprises a laser beam shaping element 168 designed as a circular shaping aperture and a reception beam shaping element 169 designed as a reception aperture array with four circular reception apertures 170. The other, second shaping element 155 comprises a laser beam shaping element 173 designed as a circular shaping aperture and a reception beam shaping element 174 designed as a reception aperture array with four circular reception apertures 175. The other, second shaping element 156 comprises a laser beam shaping element 177 designed as a circular shaping aperture and a reception beam shaping element 178 designed as a reception aperture array with seven circular reception apertures 179.

The second shaping elements 154, 155, 156 differ from each other in the diameter of the shaping aperture 168, 173, 177, in the diameter of the reception apertures 170, 175, 179, and/or in the number of reception apertures 170, 175, 179. The second shaping element 154 is provided, for example, for distance measurements to reflective films in the distance range of up to 5 m, the second shaping element 155 for distance measurements to reflective films in the distance range of 5 m to 30 m, and the second shaping element 156 for distance measurements to reflective films in the distance range of over 30 m. The distance ranges are indicated as examples of well-reflecting reflective films and depend on the quality of the surface retroreflector. The rule that applies is that the attenuation of the laser beam and the reception beam should grow smaller with declining quality of the surface retroreflector.

The second adjustment device 151 comprises five attenuation elements 182-186 designed for measuring the distance from reflective target objects, and a beam passage 187 designed for measuring the distance from scattering target objects. The attenuation elements 182-186 each comprise a laser beam attenuation element that can be arranged in the path of laser beam 41, and a reception beam attenuation element that can be arranged in the path of reception beam 42. In measuring the distance from a reflective target object, the shaping elements 152-156 of the first adjustment device 150 and the attenuation elements 182-186 of the second adjustment device 151 can be combined with each other.

The first attenuation element 182 comprises a fully permeable first laser beam attenuation element 191 and a partially permeable first reception beam attenuation element 192 with a first transmission degree $TE_1$. The second attenuation element 183 comprises a fully permeable second laser beam attenuation element 193 and a partially permeable second reception beam attenuation element 194 with a second transmission degree $TE_2$. The first and second reception beam attenuation elements 192, 194 differ from each other in the transmission degree $TE_1$, $TE_2$; for example, the first transmission degree $TE_1$ of the first reception beam attenuation element 192 is twice as large as the second transmission degree $TE_2$ of the second reception beam attenuation element 194.

The third attenuation element 184 comprises a partially permeable third laser beam attenuation element 195 and a partially permeable third reception beam attenuation element 196. In the embodiment, the transmission degree $TS_3$ of the third laser beam attenuation element 195 and the transmission degree $TE_3$ of the third reception beam attenuation element 196 match. Alternatively, the transmission degrees $TS_3$, $TE_3$ of the third laser beam attenuation element 195 and the third reception beam attenuation element 196 can differ from each other.

The fourth attenuation element 185 comprises a partially permeable fourth laser beam attenuation element 197 with a fourth transmission degree $TS_4$ and a fully permeable fourth reception beam attenuation element 198. The transmission degree $TS_4$ of the fourth laser beam attenuation element 197 is, for example, 5%.

The fifth attenuation element 186 comprises a partially permeable fifth laser beam attenuation element 199 with a fifth transmission degree $TS_5$ and a partially permeable fifth reception beam attenuation element 200 with a fifth transmission degree $TE_5$. In the embodiment, the transmission degree $TE_5$ of the fifth laser beam attenuation element 199 and the transmission degree $TE_5$ of the fifth reception beam attenuation element 200 match. Alternatively, the transmission degrees $TS_5$, $TE_5$ of the fifth laser beam attenuation element 199 and the fifth reception beam attenuation element 200 can differ from each other.

The invention claimed is:

1. A device for optically measuring a distance from a reflective target object, comprising:
    a beam source, wherein the beam source is a first electro-optical component and wherein the beam source emits a laser beam;
    wherein the reflective target object is a surface retroreflector that comprises a plurality of prisms and wherein a laser beam diameter of the laser beam is greater than respective dimensions of the plurality of prisms of the surface retroreflector and the laser beam impinges on multiple ones of the plurality of prisms of the surface retroreflector;
    a detector, wherein the detector is a second electro-optical component and wherein the detector receives a reception beam reflected or scattered at the reflective target object;
    a beam shaping system with a transmission optical system that shapes the laser beam and a reception optical system that shapes the reception beam; and
    a laser beam shaping element, wherein the laser beam shaping element is disposable in a path of the laser beam, wherein the laser beam shaping element is a shaping aperture, wherein the shaping aperture converts the laser beam into a shaped laser beam with one or more opening angles, and wherein the one or more opening angles are smaller than a maximum critical angle of 0.3 mrad.

2. The device according to claim 1, wherein the shaping aperture is partially permeable to the laser beam.

3. The device according to claim 1, wherein the laser beam shaping element includes a first laser beam shaping element that is a first shaping aperture and a second laser beam shaping element that is a second shaping aperture and wherein the first and the second shaping apertures differ from each other in a dimension, in a surface area, and/or in a permeability.

4. The device according to claim 1, wherein the reflective target object is an individual retroreflector that comprises a prism, wherein the laser beam diameter of the laser beam is smaller than dimensions of the prism and the laser beam impinges on one surface of the prism;

the device further comprising a further laser beam shaping element, wherein the further laser beam shaping element is disposable in the path of the laser beam, wherein the further laser beam shaping element is a transmission aperture array with at least one transmission aperture, and wherein the at least one transmission aperture produces a partial beam and expands the partial beam to one or more opening angles that are not smaller than a minimum critical angle of 1.0 mrad.

5. The device according to claim 4, wherein the transmission aperture array has multiple transmission apertures, wherein the multiple transmission apertures produce multiple partial beams and the multiple partial beams each expand to one or more opening angles that are not smaller than the minimum critical angle of 1.0 mrad.

6. The device according to claim 4, wherein the at least one transmission aperture is partially permeable to the laser beam.

7. The device according to claim 4 further comprising an additional laser beam shaping element, wherein the additional laser beam shaping element is disposable in the path of the laser beam, wherein the additional laser beam shaping element is an additional transmission aperture array with at least one transmission aperture, and wherein the transmission aperture array and the additional transmission aperture array are different from each other.

8. The device according to claim 7, wherein the transmission aperture array and the additional transmission aperture array differ from each other in a transmission aperture dimension.

9. The device according to claim 7, wherein the transmission aperture array and the additional transmission aperture array are different from each other in a number of respective transmission apertures, in a surface area of the respective transmission apertures, and/or in a permeability of the respective transmission apertures.

10. The device according to claim 1 further comprising a reception beam shaping element, wherein the reception beam shaping element is disposable in a path of the reception beam and wherein the reception beam shaping element is a reception aperture array with at least one reception aperture.

11. The device according to claim 10, wherein the reception aperture array has multiple reception apertures that are spaced apart from each other.

12. The device according to claim 10, wherein the at least one reception aperture is partially permeable to the reception beam.

13. The device according to claim 10, wherein the reception beam shaping element includes a first reception beam shaping element that is a first reception aperture array with at least one first reception aperture and a second reception beam shaping element that is a second reception aperture array with at least one second reception aperture, wherein the first and the second reception aperture arrays differ from each other.

14. The device according to claim 13, wherein the first and the second reception aperture arrays differ from each other in a number of reception apertures, in a surface area of the reception apertures, and/or in a permeability of the reception apertures.

15. The device according to claim 10, wherein the laser beam shaping element is a transmission aperture array, wherein the laser beam shaping element and the reception beam shaping element are disposed on a first shaping element, and wherein the first shaping element is disposable in the path of the laser beam and in the path of the reception beam.

16. The device according to claim 15 further comprising a second laser beam shaping element, wherein the second laser beam shaping element is a shaping aperture, and a second reception beam shaping element, wherein the second reception beam shaping element is a reception aperture array, wherein the second laser beam shaping element and the second reception beam shaping element are disposed on a second shaping element, and wherein the second shaping element is disposable in the path of the laser beam and in the path of the reception beam.

17. The device according to claim 16, wherein at least one first shaping element and at least one second shaping element are provided.

18. The device according to claim 17, wherein multiple first shaping elements and/or multiple second shaping elements are provided.

* * * * *